United States Patent Office 3,082,052
Patented Mar. 19, 1963

3,082,052
PROCESS FOR THE COLORATION OF CELLULOSE TEXTILE MATERIALS WITH REACTIVE DYESTUFFS
Gerald Booth and Frank Hall, Manchester, England, assignors to Imperial Chemical Industries Limited, London, England, a corporation of Great Britain
No Drawing. Original application May 11, 1959, Ser. No. 812,146. Divided and this application Nov. 18, 1959, Ser. No. 858,299
Claims priority, application Great Britain May 19, 1958
12 Claims. (Cl. 8—54.2)

This invention relates to new water-soluble dyestuffs valuable for the colouration of textile materials, for example textile materials containing protein and synthetic protein materials and more especially textile materials comprising vegetable and regenerated cellulose fibres.

This application is a division of our copending application Serial No. 812,146, filed May 11, 1959, now abandoned, and is entitled to the filing date thereof.

We have found that certain novel water-soluble dyestuffs, namely water-soluble dyestuffs containing the groupings hereinafter defined, can be chemically reacted with cellulosic fibres under simple conditions, which may readily be carried out in commercially available machinery used for dyeing or textile printing processes, that is to say, by treatment of the cellulose with an aqueous solution of the dyestuff and an alkali.

According to the present invention there are provided new water-soluble dyestuffs characterised in that they contain at least one group of the formula:

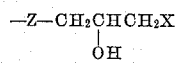

Formula I or

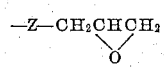

Formula II wherein Z stands for the linkage —O—, —S—, or —SO$_2$—, and wherein X stands for halogen, preferably chlorine or bromine. There may be obtained by the use of such dyestuffs under conditions hereinafter defined, coloured cellulose derivatives of the probable formula:

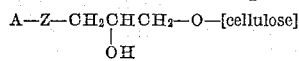

wherein Z has the meaning given above and A stands for the radical of a water-soluble coloured compound.

The new water-soluble dyestuffs may be of any dyestuff series and in particular may be members of the azo, especially monoazo, series, the anthraquinone and, preferably the phthalocyanine series, particularly those which contain a 3-chloro-2-hydroxypropoxy group. The dyestuffs may be metal-free or may contain metals; for example copper, nickel, cobalt or chromium may be present in complex formation in members of the azo or phthalocyanine series.

A preferred class of the new dyestuffs are those represented by the formula:

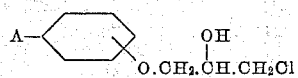

wherein A represents a radical containing from 1 to 3 sulphonic acid groups, the said radical being selected from the group consisting of N-naphthylazo, N-naphthylazopyrazolonyl, N-anthraquinonylamino and N-copper phthalocyanine sulphamyl radicals. Above all are preferred the dyestuffs of the copper phthalocyanine series containing from 2 to 3 sulphonic acid groups and from 2 to 1 (3'-chloro-2'-hydroxypropoxyphenyl)sulphamyl groups attached to the benz rings of the phthalocyanine nucleus.

The new dyestuffs may be obtained by methods in themselves known from the art or used in practice for the synthesis of water-soluble dyestuffs by reaction of dyestuff intermediates at least one of which already contains a group of the formula:

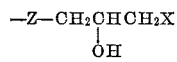

or

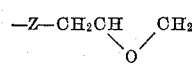

wherein X and Z have the above meanings, and at leas one of the said intermediates containing a water-solubi lising group.

In the azo series, for example aromatic amines contain ing groups of Formulas I and II may be used as diazo components in the conventional coupling reaction. Suit able diazo components include, for example:
4-(3'-chloro-2'-hydroxypropoxy)aniline, 4-(3'-bromo 2'-hydroxypropoxy)aniline, 4 - (3'-chloro-2'-hydroxypro pylmercapto)aniline, 4 - (3'-chloro-2'-hydroxypropylsul phonyl)aniline, 3 - aminophenyl-(3'-chloro-2'-hydroxy) propylsulphone, 2-(3'-chloro-2'-hydroxypropoxy)aniline 5-sulphonic acid, 2-(3'-chloro-2'-hydroxypropoxy)anilin and 3-(3'-chloro-2'-hydroxypropoxy)aniline.

Similarly, coupling components containing grouping of Formula I or of Formula II may be used. These include, for example:
7-(2':3'-epoxypropoxy) - 2 - naphthol, 7-(3'-chloro-2' hydroxypropoxy) - 2 - naphthol, 1 - [4' - (3''-chloro-2'' hydroxypropoxy)phenyl] - 3 - methyl - 5 - pyrazolone 2 - naphthol - 6 - sulphon[4'-(3''-chloro-4''-hydroxypro poxy)anilide] and 6 - (2':3' - epoxypropylmercapto) - 2 naphthol.

For the synthesis of azo dyestuffs in accordance with the invention from diazo and/or coupling component containing the groups of Formula I or II above, the diazo and coupling components are so chosen that the resultan dyestuff contains at least one water-solubilising grouping The above amines listed as diazo components can als be used as intermediates for the synthesis of dyestuffs is series other than the azo series, for example, by reacting the amine with a dyestuff containing sulphonchloridε groups, for example, the phthalocyanines of United King dom specification No. 515,637 or amino- or substitutec amino-anthraquinones containing 2 or more sulphonchlo ride groups.

The proportion of amine used may be varied to obtai different proportions of sulphonamide groups and sul phonic acid groups, but, as will be apparent, it is essen tial that at least one molecular proportion of the amin is used for each molecular proportion of the dyestuf containing sulphonchloride groups. When the dyestuf containing sulphonchloride groups also contains sul phonic acid or other water-solubilising groups, an excess of amine may be used over the amount necessary to reac completely with the sulphonchloride groups present When the dyestuff containing sulphonchloride group does not contain any water-solubilising group, the pro portion of amine added should be insufficient to caus complete conversion of all the sulphonchloride groups to sulphonamide groups. Any sulphonchloride group which do not react with the amine may be hydrolysec by carring out the process in aqueous medium or b; after-treating the dyestuff containing both sulphonchlo ride and sulphonamide groups in a weakly alkaline aque ous solution; aqueous pyridine at a temperature of abou 25° C. is particularly suitable for this hydrolysis step The hydrochloric acid liberated during the reaction may be neutralised by adding an acid-binding agent, for example, by adding a salt of a weak acid such as sodium bicarbonate, sodium carbonate or sodium acetate.

The above amines may also be reacted with other dyestuff intermediates containing reactive halogen atoms, for example, 1-amino-4-bromoanthraquinone - 2 - sulphonic acid to give blue dyestuffs, and o-chloronitrobenzene and its sulphonic acid and similar compounds to give greenish yellow dyestuffs of the o-nitro-diarylamine series.

The new dyestuffs may also be obtained by treating a water-soluble coloured compound containing at least one group of the formula:

$$-Z-M$$

wherein Z has the meaning given above and M stands for a hydrogen atom or an alkali metal such as sodium or potassium, with a 2:3-epoxypropyl halide, preferably epichlorhydrin or epibromhydrin or with an alkali and a 1:3-dihalogeno-2-propanol such as glycerol dichlorhydrin. Suitable coloured compounds for use in this process include, for example, 3-carboxy-4-hydroxyazobenzene-4'-sulphonic acid, 3-carboxy-4-mercaptoazobenzene-4'-sulphonic acid 1-amino-4(4'-hydroxyanilino)anthraquinone-2:5-disulphonic acid, and sulphonated copper phthalocyanines containing (4-hydroxy-3-sulphophenyl) sulphamyl, (3-hydroxy-4-carboxyphenyl)sulphamyl, (2-hydroxyethyl)sulphamyl, mercapto or mercaptomethyl (—CH$_2$.SH) groups.

The new dyestuffs may be used for the colouration, by dyeing or printing, of a wide variety of textile materials. Nitrogenous materials such as natural proteins, for example, wool, silk and leather, or synthetics such as nylon or polyacrylonitrile may be dyed, for example in hot acid, neutral or weakly alkaline aqueous solutions of the dyestuff.

The new water-soluble dyestuffs may be used for the colouration of vegetable and regenerated cellulose fibres such as cotton, linen and viscose rayon, the treatment being carried out in conjunction with a treatment at elevated temperature with an alkali. When so applied the new dyestuffs are believed to react chemically with the fibre, this belief being based on the resistance of the colouration to severe washing treatments and also to solvent extraction treatments. This colouration process forms a further feature of the invention.

The above process may readily be adapted so that it may be carried out in the commercially-available machinery used for dyeing or textile printing processes and for continuous or non-continuous variations of such processes.

Thus the cellulose material may be impregnated with an alkali and with the dyestuff and then subjected to a heating or steaming step in, for example, a hot flue dryer, a molten metal bath, an oven or a stenter.

The impregnation may be carried out, for example, by padding the material in an aqueous solution containing both dyestuff and alkali or, in either order, through aqueous solutions containing separately the dyestuff and the alkali.

Preferably the material is padded in an aqueous solution of the dyestuff and dried by any convenient means and the dried material is padded through an aqueous solution of alkali and then steamed or heated for example at between 100 and 130° C.

The solution of dyestuff may contain adjuvants commonly-used in dyeing, for example urea, wetting agents such as the condensation products of fatty alcohols or alkylated phenols with ethylene oxide, sulphonated oils, methylene dinaphthalene sulphonic acid or oleyl sodium sulphate and migration inhibitors such as Glauber's salt, common salt, or sodium alginate.

The solution of alkali, particularly when used in the preferred manner described above, may contain alkaline and neutral electrolytes such as sodium chloride, sodium sulphate and potassium chloride. Preferably, there is used a solution containing at least 0.5% by weight, and preferably between 1% and 3% by weight of a caustic alkali such as caustic soda or caustic potash, since the subsequent fixation of the dyestuff may then be achieved by a relatively short steaming step of between 1 and 5 minutes, thus rendering the process particularly suitable for continuous dyeing. Solutions containing a higher concentration of alkali, for example up to 25 to 30% of alkali, may also be used.

When the alkali is added to the solution of dyestuff, there can be used a non-caustic alkali, to lessen premature hydrolysis of the reactive groups. Preferably an alkali capable of giving a pH of at least 10 in aqueous solution is used, although there may also be used certain milder alkalis, for example alkali metal bicarbonates, which are converted to an alkali capable of giving a pH of at least 10 at the elevated temperature necessary to cause reaction of the cellulose with the dyestuff.

The treatment of the cellulose textile material with the dyestuff and the alkali may also be carried out by textile printing methods, for example by locally treating the textile material with a printing paste containing the dyestuff and an alkali, and thereafter subjecting the printed material to an elevated temperature, for example by a heating or a steaming step. Alternatively, the alkali may be applied in a separate step, before or after printing the material with a printing paste containing the dyestuff.

The printing pastes used may contain the adjuvants commonly-used in the formation of textile printing pastes, for example, urea, wetting agents as exemplified above, mild oxidising agents such as sodium m-nitrobenzene sulphonate, and thickening agents. As thickening agents, there may be used, for example, starch, British gum, gum tragacanth, or alkyl ethers of cellulose, but preferably there are used thickening agents free from primary alcoholic hydroxyl groups, for example the emulsion thickeners described in United Kingdom specification No. 524,803, or preferably alginates, especially sodium alginate.

Since these preferred thickening agents are adversely affected by caustic alkalis, it is preferred to use milder alkalis such as sodium carbonate, trisodium phosphate or sodium metasilicate when the alkali is added to the printing paste. As in the dyeing recipes, an alkali capable of giving a pH of at least 10.0 in aqueous solution is necessary, although milder alkalis such as alkali metal bicarbonates which are converted during the heating or steaming step to an alkali as defined above, may be used.

It will be appreciated that any dyestuff which has been absorbed by the cellulose material but which has not reacted with it, will behave as a so-called "direct" dyestuff and will be removable from the coloured cellulose by subsequent washing treatments at a rate which depends upon its affinity for cellulose. It is therefore a preferred feature of the present process to use dyestuffs having poor affinity for cellulose when dyed in the absence of alkali, and to subject the coloured cellulose to a scouring treatment, for example by boiling in a dilute aqueous solution of soap or detergent for at least 1 minute and preferably at least 5 minutes, to remove unreacted dyestuff before finally drying the material.

When the dyestuff used in the colouration process contains suitable groupings, for example diazotisable amino groups, aromatic hydroxyl or keto-enol groups or metallisable systems, the coloured cellulose may be subjected to further treatments e.g. with nitrous acid and then a coupling component; or with a diazotised amine; or with an agent yielding metal, to modify the shade or properties of the coloured cellulose.

The new colouration process may be applied to a wide variety of cellulose materials, for example textile materials such as loose fibre of cotton and linen, viscose rayon filament and staple fibre, to fabrics woven entirely or partly from such fibres.

The resultant colourations are very fast to washing treatments, and according to the dyestuff residue attached thereto may be fast to light, to bleaching treatments, to treatments with acid and alkali, or to burnt gas fumes. They are thus suitable for the manufacture of textile materials with a high degree of washing fastness for example high quality shirtings and sheetings, and also for furnishing materials.

The invention is illustrated but not limited by the following examples in which parts and percentages are by weight:

Example 1

4 parts of 4-(3'-chloro-2'-hydroxypropoxy)aniline, obtained as described below, are dissolved in 60 parts of water and 4 parts of aqueous hydrochloric acid of specific gravity 1.16 at 5° C. A solution of 1.4 parts of sodium nitrite in 10 parts of water is added during 10 minutes. The mixture is stirred for 5 minutes and excess nitrous acid is removed by adding sulphamic acid. The diazo compound so obtained is added to a suspension, cooled to 5° C., of 4.78 parts of 2-amino-8-hydroxynaphthalene-6-sulphonic acid in 60 parts of water and the mixture is stirred for 20 hours at 5° C. 5 parts of sodium bicarbonate are added and then sodium chloride is added at the rate of 150 grams for each litre of mixture. The precipitated dyestuff is filtered off and dried. It is obtained in the form of a brown powder which dissolves readily in water to give a brown solution. The organically combined chlorine content of the product corresponds to 1 atom of chlorine per azo link. The product colours cellulose textile materials in brown shades very fast to washing when applied in conjunction with an alkali. A number of suitable recipes are given below in Examples 3 to 6.

The 4-(3'-chloro-2'-hydroxypropoxy)aniline used in the above example may be obtained as follows:

46 parts of 4-(3'-chloro-2'-hydroxypropoxy)nitrobenzene obtained according to the method described by Stephenson in the Journal of the Chemical Society, 1954, at p. 1571, are dissolved in 370 parts of ethyl alcohol and 10 parts of finely divided nickel are then added. The mixture is then heated at from 40 to 50° C. for 6 hours in an autoclave with hydrogen at 100 atmospheres pressure, and cooled. The suspended nickel is removed by filtration and the resulting alcoholic solution is evaporated to dryness. The residual oil consists of 39 parts of crude 4-(3'-chloro-2'-hydroxypropoxy)aniline which can be purified by recrystallization of its halfsulphate.

Example 2

23 parts of copper phthalocyanine are heated in 240 parts of chlorosulphonic acid at 138° C. for 4 hours, then the solution is cooled and drowned into ice and water. The precipitate, which consists substantially of copper phthalocyanine-tetra-(3')-sulphonchloride, is filtered off, suspended in 400 parts of water cooled to below 5° C. and the pH of the mixture is brought to 7 by adding sodium carbonate.

A solution of 16.1 parts of 4-(3'-chloro-2'-hydroxypropoxy)aniline in 50 parts of water and 8.1 parts of aqueous hydrochloric acid of specific gravity 1.16 is then added followed by the addition of 34 parts of sodium bicarbonate. The mixture is stirred at below 5° C. for 5 hours and then at 20° C. for 12 hours and the precipitated material is then filtered off and dried.

The product so obtained is a dark blue powder which is soluble in water. The figures obtained on analysis of the product show it to contain at least two sulphonic acid groups and between 1.5 and 2 sulphon (4-(3'-chloro-2'-hydroxypropoxy)anilide) groupings per molecule.

The product colours cellulosic textile materials in greenish blue shades very fast to washing when applied in conjunction with an alkali by the recipes, or simple varations of the recipes, described in Examples 3 to 6.

Example 3

100 parts of cotton fabric are padded in a 2% aqueous solution of the dyestuff of Example 1 containing 0.2% of a highly sulphonated oil and 2% of sodium sulphate, and squeezed until the weight of the fabric is 200 parts. The fabric is dried, padded in an aqeuous solution containing 2% of caustic soda and 30% of sodium chloride and again squeezed until its weight is 200 parts.

The fabric is then steamed for 1 minute at 100° C., then rinsed in water, boiled in a dilute soap solution for five minutes, rinsed again in water and dried.

The fabric is coloured a brown shade, very fast to washing.

Example 4

A print paste is prepared having the following composition:

|  | Parts |
|---|---|
| Dyestuff of Example 2 | 3.0 |
| Urea | 5.0 |
| Water | 55.5 |
| Sodium alginate (5% aqueous solution) | 35.0 |
| Sodium bicarbonate | 1.5 |
|  | 100 |

The paste is applied to a plain weave cotton fabric by means of a roller printing machine. The prints are dried, steamed for 10 minutes at atmospheric pressure, rinsed in cold water, washed in a boiling dilute soap solution for 5 minutes, rinsed and dried.

The greenish-blue prints so obtained have excellent fastness to washing.

Example 5

100 parts of viscose rayon yarn are added to a solution at 50° C. containing 1 part of the dyestuff used in Example 1 in 3,000 parts of water and 90 parts of sodium chloride are then added. The solution is then heated to 90° C. and treatment continued at this temperature for 30 minutes. A solution of 5 parts of caustic soda flake in water is then added. After a further 60 minutes the viscose rayon is removed, rinsed in water and finally "soaped" for 15 minutes in a boiling solution containing 9 parts of an alkyl phenol-ethylene oxide condensate in 3,000 parts of water and it is then rinsed in water and dried. The viscose rayon is dyed a brown shade.

A similar result is obtained if trisodium phosphate is used in place of the caustic soda.

Example 6

A length of plain weave cotton fabric is padded with an aqueous solution containing 1% of the dyestuff of Example 2, 2% of sodium carbonate, 20% of urea and 0.2% of a wetting agent consisting of a highly sulphonated oil, and squeezed until the fabric retains only its own weight of solution. The fabric is then heated at a temperature of 125 to 130° C. for 2 minutes, then is rinsed, washed, rinsed and dried as described in Example 3. The fabric is coloured a greenish blue shade very fast to washing.

Example 7

By carrying out the procedure of Example 1 but adding sufficient alkali to give a pH of about 9, a brownish-red dyestuff is obtained.

Example 8

4 parts of 4-(3'-chloro-2'-hydroxypropoxy) aniline are diazotised as described in Example 1 and added to a solution of 7.3 parts of 1-acetylamine-8-hydroxynaphthalene-3:6-disulphonic acid and 3.2 parts of sodium bicarbonate in 50 parts of water. The mixture is stirred a 20° C. and at a pH of 8.8 for 1 hour, then sodium chloride is added to precipitate the dyestuff which is filtered off and dried. The red powder so obtained contains 1 atom of organically bound chlorine per azo group. It dyes cellulose by the methods of Examples 3 to 6 in red-violet shades of good fastness to washing.

*Example 9*

16 parts of 4-(3'-chloro-2'-hydroxypropoxy)aniline, half sulphate are dissolved in 60 parts of water and 16 parts of 36% aqueous hydrochloric acid, and diazotised at below 10° C. with a solution of 5.6 parts of sodium nitrite in 80 parts of water, added over 10 minutes. After 5 minutes excess nitrous acid is removed by a small addition of sulphamic acid. The diazo compound so obtained is added during 30 minutes to a solution, cooled to 10° C., of 19.2 parts of 2-amino-5-hydroxynaphthalene-7-sulphonic acid and 13 parts of sodium bicarbonate in 200 parts of water. The mixture is adjusted to pH 7 to 8 by addition of 4 parts of sodium bicarbonate and stirred allowing the temperature to rise to 20° C. After 2 to 3 hours, the pH being in the range 9 to 10, sodium chloride is added and the suspension of slightly tarry precipitated dyestuff is stirred and cooled, to harden. The dyestuff is filtered off, washed on the filter with 10% brine and dried at 40° C.

The reddish-brown powder so obtained contains 1 atom of organically bound chlorine per azo group. It dyes cellulose by the methods of Examples 3 to 6 in dull red shades fast to washing.

By replacing the 19.2 parts of 2-amino-5-hydroxynaphthalene-7-sulphonic acid with 22.5 parts of 2-acetylamine-5-hydroxynaphthalene-7-sulphonic acid, or with 27.5 parts of 2-benzoylamino-5-hydroxynaphthalene - 7 - sulphonic acid, a dyestuff is obtained containing 1 atom of organically combined chlorine per azo group. Each dyes cellulose by the methods of Examples 3 to 6 in red shades fast to washing.

*Example 10*

8 parts of 4-(3'-chloro-2'-hydroxypropoxyaniline) half sulphate are diazotised as described in Example 9. The diazo compound so obtained is added to a solution, cooled to 5° C., of 10.1 parts of the urea of 2-amino-5-hydroxynaphthalene-7-sulphonic acid in 200 parts of water and 6.4 parts of sodium bicarbonate. The mixture is stirred for 18 hours allowing the temperature to rise to 20° C., then sodium chloride is added to coagulate the gelatinous dyestuff suspension. The dyestuff so obtained is filtered off and dried at 40° C.

It is obtained as a reddish powder, containing 1 atom of organically bound chlorine per azo group. It dyes cellulose by the methods of Examples 3 to 6 in strong red shades fast to washing.

*Example 11*

4 parts of 2-(3'-chloro-2'-hydroxypropoxy) aniline are diazotised in the manner described in Example 1. Excess nitrous acid in the diazo solution is removed with sulphamic acid. The diazo solution is added to a suspension, cooled to 5° C., of 4.78 parts of 2-amino-8-hydroxynaphthalene-6-sulphonic acid in 50 parts of water, then 10 parts of sodium acetate crystals are added and the mixture is stirred for 20 hours at 5° C. Sodium chloride is then added and the precipitated dyestuff is filtered off and dried.

It dyes cellulose by the methods of Examples 3 to 6 in brown-red shades of good fastness to washing.

The 2-(3'-chloro-2'-hydroxypropoxy) aniline used in the above example may be obtained and purified in analogous manner to the method described for its para-isomer in Example 1. The sulphate melts at 175 to 176° C.

*Example 12*

By coupling diazotised 2-(3'-chloro-2'-hydroxypropoxy) aniline with 1-acetylamino-8-hydroxynaphthalene-3:6-disulphonic acid in similar manner to the method described in Example 8, a dyestuff is obtained which dyes cellulose by the methods of Examples 3 to 6 in red-violet shades fast to washing.

*Example 13*

If the 4-(3'-chloro-2'-hydroxypropoxy)aniline used in Example 8 is replaced by 3-(3'-chloro-2'-hydroxypropoxy)aniline, a dyestuff is obtained giving a rubine shade fast to washing when applied to cellulose by the methods of Examples 3 to 6.

The 3-(3'-chloro-2-hydroxypropoxy)aniline used in the above example may be obtained and purified in analogous manner to the method described for its para-isomer in Example 1. The sulphate melts at 90 to 95° C.

*Example 14*

If the 2-(3'-chloro-2'-hydroxypropoxy)aniline used in Example 11 is replaced by 3-(3'-chloro-2'-hydroxypropoxy)aniline a dyestuff is obtained giving brown-red shades fast to washing when applied to cellulose by the methods of Examples 3 to 6.

*Example 15*

If the 4-(3'-chloro-2'-hydroxypropoxy)aniline used in Example 8 is replaced by 5.04 parts of 1-chloro-3-(m-aminobenzyloxy)-2-propanol hydrochloride, a dyestuff is obtained which gives bluish red shades when applied to cellulose by the methods of Examples 3 to 6.

The 1-chloro-3-(m-aminobenzyloxy)-2-propanol hydrochloride used in this example may be obtained by heating m-nitrobenzyl alcohol with epichlorhydrin in the presence of piperidine as catalyst, reducing the product so obtained by catalytic hydrogenation and forming the hydrochloride.

*Example 16*

If the 2-(3'-chloro-2'-hydroxypropoxy)aniline used in Example 8 is replaced by 5.04 parts of 1-chloro-3-(m-aminobenzyloxy)-2-propanol hydrochloride, a dyestuff is obtained which dyes cellulose by the methods of Examples 3 to 6 in dull red shades of good fastness to washing.

*Example 17*

By replacing the 4-(3'-chloro-2'-hydroxypropoxy)aniline used in Example 8 by 5.1 parts of 4-(3'-chloro-2'-hydroxypropylmercapto)aniline hydrochloride, a dyestuff is obtained which dyes cellulose by the methods of Examples 3 to 6 in violet shades of good fastness to washing.

The 4-(3'-chloro-2'-hydroxypropylmercapto)aniline hydrochloride used in the above example may be obtained as follows:

87 parts of p-nitrothiophenol, 1 part of piperidine and 168 parts of epichlorhydrin are stirred in 600 parts of dry toluene at 95° C. for 45 minutes. The toluene is removed by distillation at 15 mm. pressure and the product is dissolved in 175 parts of benzene and is twice precipitated by addition of petroleum. The oil is then dissolved in 350 parts of benzene and the solution is washed with an equal volume of 36% aqueous hydrochloric acid, and then with water until free from acid. The solution is then evaporated to give a yellow solid melting at 41° to 43° C.

65 parts of the product so obtained are dissolved in 325 parts of methanol and hydrogenated at 50° C., 100 atmospheres pressure in the presence of Raney nickel catalyst. The catalyst is filtered off, the methanol is removed by distillation and residual oil is dissolved in chloroform and treated with dry hydrochloric acid. A tar precipitates and this is triturated with ethyl acetate until it solidifies.

*Example 18*

If the 4-(3'-chloro-2'-hydroxypropoxy)aniline used in Example 8 is replaced by 5 parts of 4-(3'-chloro-2'-hydroxypropysulphonyl)aniline, a dyestuff is obtained which yields dull red shades of good fastness to washing when applied to cellulose by the methods described in Examples 3 to 6.

The 4-(3'-chloro-2'-hydroxypropylsulphonyl)aniline used in this example may be obtained by oxidising 3-(4'-nitrophenylthio)-2-hydroxypropyl chloride with hydrogen peroxide in acetic acid and catalytically reducing the product so obtained in the presence of Raney nickel. It melts at 126 to 128° C.

*Example 19*

If the 2-(3'-chloro-2'-hydroxypropoxy)aniline used in Example 11 is replaced by 5 parts of 4-(3'-chloro-2'-hydroxypropylsulphonyl)aniline, a dyestuff is obtained which dyes cellulose by the methods of Examples 3 to 6 to give red shades of good fastness to washing.

*Example 20*

6.1 parts of 2-aminonaphthalene-1:5-disulphonic acid is stirred with 50 parts of water and 4 parts of aqueous hydrochloric acid of specific gravity 1.16 and diazotised at 5° C. by addition of 1.4 parts of sodium nitrite. After ten minutes the excess nitrous acid is removed with sulphamic acid and the diazo compound is added to a solution at 5° C. of 5.7 parts of 1-[4'-(3''-chloro-2''-hydroxypropoxy)phenyl]-3-methyl-5-pyrazolone in 50 parts of ethylene glycol monomethyl ether, 200 parts of water, 0.8 part of sodium hydroxide and 8 parts of sodium acetate crystals. The mixture is stirred for 1 hour, then sodium chloride is added and the dyestuff which precipitates is filtered off, washed with 5% brine and dried.

The yellow powder so obtained contains one atom of organically bound chlorine per azo group. It dyes cellulose by the methods of Examples 3 to 6 in yellow shades of good fastness to washing.

*Examples 21 to 28*

If in the process of Example 2, the 16.1 parts of 4-(3'-chloro-2'-hydroxypropoxy)aniline are replaced by:

(21) 10.1 parts of 4-(3'-chloro-2'-hydroxypropoxy)-aniline,
(22) 17.4 parts of 4-(3'-chloro-2'-hydroxypropyl-mercapto)aniline,
(23) 10.1 parts of 2-(3'-chloro-2'-hydroxypropoxy)-aniline,
(24) 12.1 parts of 2-(3'-chloro-2'-hydroxypropoxy)-aniline,
(25) 10.1 parts of 3-(3'-chloro-2'-hydroxypropoxy)-aniline,
(26) 12.1 parts of 3-(3'-chloro-2'-hydroxypropoxy)-aniline,
(27) 11.8 parts of 1-chloro-3-(m-aminobenzyloxy)-2-propanol, or
(28) 12.9 parts of 1-chloro-3-(m-aminobenzyloxy)-2-propanol dyestuffs are obtained which have, in general, similar properties to those of the dyestuff of Example 2, in that they give greenish-blue shades of good fastness to washing when applied to cellulose by the methods of Examples 3 to 6.

*Examples 29 to 36*

If, in the process of Example 2, there is used, in place of the copper phthalocyanine-tetra-(3')-sulphonchloride, an equivalent amount of copper phthalocyanine-tetra-(4')-sulphonchloride (obtained by heating copper phthalocyanine-tetra-(4')-sulphonic acid with chlorosulphonic acid at 115° to 120° C. for 4 hours) a dyestuff of similar general properties is obtained.

Similar dyestuffs are also obtained if, in addition to the exchange of copper phthalocyanine-tetra-sulphonchlorides, there is used, in place of the 4-(3'-chloro-2'-hydroxypropoxy)aniline,

(30) 10.1 parts of 4-(3'-chloro-2'-hydroxypropoxy)-aniline,
(31) 10.1 parts of 2-(3'-chloro-2'-hydroxypropoxy)-aniline,
(32) 12.1 parts of 2-(3'-chloro-2'-hydroxypropoxy)-aniline,
(33) 10.1 parts of 3-(3'-chloro-2'-hydroxypropoxy)-aniline,
(34) 12.1 parts of 3-(3'-chloro-2'-hydroxypropoxy)-aniline,
(35) 11.8 parts of 1-chloro-3-(m-aminobenzyloxy)-2-propanol, or
(36) 12.9 parts of 1-chloro-3-(m-aminobenzyloxy)-2-propanol.

*Example 37*

46 parts of copper phthalocyanine are chlorosulphonated using the conditions described in Example 2 and the solution is drowned into ice-water, filtered off and washed well with water. The paste so obtained is added during 1 hour to a stirred mixture of 291 parts of sodium bisulphite and 73.6 parts of sodium hydroxide in 1000 parts of water, keeping the pH at from 7.0 to 7.5 by adding 10% aqueous sodium carbonate solution as necessary. 18.5 parts of sodium bicarbonate are added and the mixture is stirred at 20° C. for 18 hours. Sufficient aqueous caustic soda solution is then added to give a pH of 10.5 and the mixture is stirred for 1 hour. The mixture is then acidified to methyl orange and the precipitate is filtered off and dried.

The product so obtained on titration with nitrous acid is found to have one sulphinic acid and 3 sulphonic acid groups in the molecule.

25.6 parts of the product so obtained, containing 17.6 (0.02 mole) of the pure compound are dissolved in 220 parts of water by adding 4% aqueous caustic soda until the pH of the mixture is 6.4. The solution is filtered and a solution of 4.55 parts of disodium hydrogen phosphate and 7.5 parts of sodium dihydrogen phosphate in 40 parts of water is added. 11.4 parts of epichlorhydrin are added and the solution is stirred at 55 to 60° C. for 80 hours. The mixture is made acid to methyl orange and the precipitate is filtered off, washed with acetone and dried.

The product so obtained is found to contain about 1 atom of hydrolysable chloride (i.e. to contain one

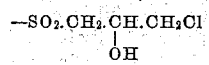

group) in the molecule. It dyes cellulose by the methods described in Examples 3 to 6 in greenish-blue shades of good fastness to washing.

*Example 38*

A solution of 13.95 parts of sodium 1-amino-4-bromo-anthraquinone-2-sulphonate in 300 parts of water is added to a stirred mixture of 0.25 part of $CuSO_4 5H_2O$, 0.25 part of $Cu_2Cl_2$ and 22.38 parts $NaHCO_3$ in 300 parts water. Then 18.0 parts of p-(3'-chloro-2'-hydroxy)propoxy aniline sulphate are added during 10 minutes. The mixture is warmed to 65° C. and stirred for 45 minutes, filtered hot, cooled and 65 parts of salt are added to the cold filtrates. An oil is produced which solidifies on standing for several hours. The solid so obtained is filtered off and purified by dissolving in 750 parts of water at 50° C., filtering and salting the filtrates with 75 parts of salt. This operation is repeated three times and it is then dried.

The product so obtained dyes cellulose in blue shades of good fastness to washing when applied by the methods of Examples 3 to 6.

What we claim is:
1. Process for the coloration of cellulose textile materials with a water-soluble dyestuff characterized by one of the formulae

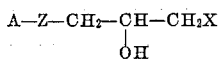

and

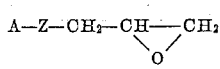

wherein —Z— stands for a linkage selected from the group consisting of —O—, —S— and —SO$_2$—; X stands for a halogen atom selected from the group consisting of bromine and chlorine; and A represents the radical of a water-soluble colored compound of a dyestuff series selected from the class consisting of azo, anthraquinone and phthalocyanine series; which process comprises treating the said materials with said dyestuff in aqueous medium in conjunction with a treatment of said materials with an alkali at an elevated temperature.

2. Process according to claim 1 wherein said water-soluble dyestuff is of the formula

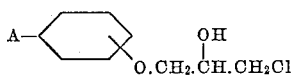

wherein A represents a radical containing from 1 to 3 sulphonic acid groups, the said radical being selected from the group consisting of N-naphthylazo, N-naphthylazopyrazolonyl, N-anthraquinoylamino and N-copper phthalocyanine sulphamyl radicals.

3. Process according to claim 1 wherein said water-soluble dyestuff is of the copper phthalocyanine series containing from 2 to 3 sulfonic acid groups and from 2 to 1 (3'-chloro-2'-hydroxypropoxypropyl) sulphamyl groups attached to the benzine rings of the phthalocyanine nucleus.

4. Process according to claim 1 wherein the cellulose material is padded through an aqueous solution of the dyestuff and then through an aqueous solution of the alkali, and then the impregnated material is subjected to elevated temperature.

5. Process according to claim 1 wherein the cellulose material is padded through an aqueous solution of the alkali and then through an aqueous solution of the dyestuff and then the impregnated material is subjected to elevated temperature.

6. Process according to claim 1 wherein the cellulose material is impregnated with an alkali and with the dyestuff by padding the material in an aqueous solution containing both dyestuff and alkali and then subjecting the impregnated material to a heating or steaming step.

7. Process according to claim 1 wherein the material is padded in an aqueous solution of the dyestuff and dried by any convenient means and the dried material is padded through an aqueous solution of alkali and then treated at between 100° C. and 130° C.

8. Process for the localised colouration of cellulose textile material according to claim 1 which comprises applying locally to the material a printing paste containing the dyestuff and an alkali, and thereafter subjecting the printed material to an elevated temperature.

9. Process as claimed in claim 1 wherein the alkali used is capable of giving a pH of at least 10 in aqueous solution.

10. Process as claimed in claim 1 wherein the alkali used is itself incapable of giving a pH of 10 in aqueous solution, but is converted to an alkali capable of giving a pH of at least 10 during the treatment at an elevated temperature.

11. Process as claimed in claim 1 wherein the dyestuff used has a poor affinity for cellulose when dyed in the absence of alkali, and the coloured textile material is subjected to a scouring treatment.

12. Coloured cellulose derivatives of the formula:

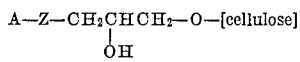

wherein —Z— is selected from the class consisting of —O—, —S— and —SO$_2$— and A stands for the radical of a water-soluble coloured compound selected from the class consisting of water-soluble azo, anthraquinone, and phthalocyanine dyestuffs.

References Cited in the file of this patent

UNITED STATES PATENTS

| | | |
|---|---|---|
| 1,935,624 | Ellis et al. | Nov. 21, 1933 |
| 1,935,657 | Mosby et al. | Nov. 21, 1933 |
| 1,986,801 | Ellis | Jan. 8, 1935 |
| 2,131,712 | Schoeller et al. | Sept. 27, 1938 |
| 2,309,176 | Dreyfus | Jan. 26, 1943 |
| 2,741,532 | Guthrie | Apr. 10, 1956 |
| 2,873,269 | Fasciati et al. | Feb. 10, 1959 |
| 2,892,828 | Stephen | June 30, 1959 |
| 2,895,785 | Alsberg et al. | July 21 1959 |
| 2,985,501 | Gagarine | May 23, 1961 |
| 3,009,920 | Jaeger et al. | Nov. 21, 1961 |

FOREIGN PATENTS

| | | |
|---|---|---|
| 149,986 | Austria | June 25, 1937 |
| 151,300 | Austria | Nov. 10, 1937 |
| 696,282 | Great Britain | Aug. 26, 1953 |

OTHER REFERENCES

Wegmann: "Textil-Proxis," October 1958, p. 1056.